US010332406B2

(12) United States Patent
Chan et al.

(10) Patent No.: US 10,332,406 B2
(45) Date of Patent: *Jun. 25, 2019

(54) DYNAMIC GEO-FENCE FOR DRONE (71) Applicant: INTERNATIONAL BUSINESS MACHINES CORPORATION, Armonk, NY (US)

(72) Inventors: Yuk L. Chan, Rochester, NY (US); Kyle E. Gilbertson, Rochester, MN (US); Daniel F. Hogerty, Green Brook, NJ (US); Eileen P. Tedesco, Sharon, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/813,674

(22) Filed: Nov. 15, 2017

(65) Prior Publication Data

US 2018/0082592 A1 Mar. 22, 2018

Related U.S. Application Data (62) Division of application No. 14/951,533, filed on Nov. 25, 2015, now Pat. No. 9,928,748.

(51) Int. Cl.
G05D 1/00 (2006.01)
G05D 1/04 (2006.01)
G08G 5/00 (2006.01)
B64C 39/02 (2006.01)
B64D 47/08 (2006.01)

(52) U.S. Cl.
CPC .......... *G08G 5/006* (2013.01); *B64C 39/024* (2013.01); *B64D 47/08* (2013.01); *G05D 1/0011* (2013.01); *G05D 1/042* (2013.01); *G08G 5/0013* (2013.01); *G08G 5/0069* (2013.01); *B64C 2201/128* (2013.01); *B64C 2201/141* (2013.01)

(58) Field of Classification Search
CPC ...... G08G 5/006; B64C 39/024; B64D 47/08; G05D 1/0011; G05D 1/042
See application file for complete search history.

(56) References Cited

U.S. PATENT DOCUMENTS 9,508,263 B1 * 11/2016 Teng ................. B64C 39/024
9,928,748 B2 * 3/2018 Chan ................. G08G 5/006
(Continued)

OTHER PUBLICATIONS

List of IBM Patents or Patent Applications Treated as Related; (Appendix P), Filed Nov. 15, 2017; 2 pages.
(Continued)

*Primary Examiner* — Hussein Elchanti
(74) *Attorney, Agent, or Firm* — Cantor Colburn LLP; Teddi Maranzano (57) ABSTRACT

Technical solutions are described for configuring a dynamic geo-fence includes receiving a plurality of data samples. The method also includes selecting, from the plurality of data samples, a selected data sample as a threshold. The method also includes configuring a geo-fence for a geographic area based on the selected data sample. The method also includes adjusting an operational characteristic of a drone while the drone is in the geographic area, where the operational characteristic is adjusted based on a configuration of the drone and the geo-fence.

20 Claims, 9 Drawing Sheets

(56) References Cited

U.S. PATENT DOCUMENTS

| | | | | |
|---|---|---|---|---|
| 2009/0027253 A1* | 1/2009 | van Tooren | ......... | G01S 13/9303 |
| | | | | 342/29 |
| 2010/0042269 A1* | 2/2010 | Kokkeby | .............. | G01S 3/7864 |
| | | | | 701/3 |
| 2014/0018979 A1* | 1/2014 | Goossen | .............. | G08G 5/0034 |
| | | | | 701/3 |
| 2017/0110014 A1* | 4/2017 | Teng | ..................... | B64C 39/024 |

OTHER PUBLICATIONS

Yuk L. Chan et al."Dynamic Geo-Fence for Drone", U.S. Appl. No. 14/951,533, filed Nov. 25, 2015.
List of IBM Patents or Patent Applications Treated as Related; (Appendix P), Filed May 21, 2018; 2 pages.
Yuk L. Chan et al."Dynamic Geo-Fence for Drone", U.S. Appl. No. 15/810,712, filed Nov. 13, 2017.

* cited by examiner

DYNAMIC GEO-FENCE FOR DRONE

PRIORITY

This application is a divisional of U.S. Non-Provisional Application Ser. No. 14/951,533, entitled "DYNAMIC GEO-FENCE FOR DRONE", filed Nov. 25, 2015, the entire contents of which are incorporated herein by reference.

BACKGROUND

The present application relates to autonomous drones or unmanned aerial vehicles and more specifically, to dynamically restricting a fly zone of a drone.

Autonomous drones, also referred to as unmanned aerial vehicles (UAVs) and remotely piloted aircraft (RPA), are expected to be ruled eligible for use by private and corporate entities subject to pending to regulations implemented by various aviation authorities such as, for example, the Federal Aviation Admiration (FAA). Proposed uses for drones include, but are not limited to, city ordinance enforcement, other government functions, package delivery, and image capturing. Therefore, it is envisioned that users could purchase drones to achieve a certain set of needs or tasks such as delivering a payload from a warehouse to a customer. However, use of drones has raised many privacy concerns since the drones can fly over private property capturing data such as images, audio, video, and other such data.

SUMMARY

According to an embodiment, a computer-implemented method for configuring a dynamic geo-fence includes receiving a plurality of data samples. The computer-implemented method also includes selecting, from the plurality of data samples, a selected data sample as a threshold. The computer-implemented method also includes configuring a geo-fence for a geographic area based on the selected data sample. The computer-implemented method also includes adjusting an operational characteristic of a drone while the drone is in the geographic area, where the operational characteristic is adjusted based on a configuration of the drone and the geo-fence.

According to another embodiment, a system for configuring dynamic geo-fences includes a memory that stores a plurality of data samples. The system also includes a processor. The processor selects, from the plurality of data samples, a selected data sample as a threshold. The processor also sets up a geo-fence for a geographic area based on the selected data sample. The processor also adjusts an operational characteristic of a drone while the drone is in the geographic area, where the operational characteristic is adjusted based on a configuration of the drone and the geo-fence.

According to another embodiment, a computer program product for configuring dynamic geo-fences includes a computer readable storage medium. The computer readable storage medium includes computer executable instructions to access a plurality of data samples. The computer readable storage medium also includes computer executable instructions to select, from the plurality of data samples, a selected data sample as a threshold. The computer readable storage medium also includes computer executable instructions to setup a geo-fence for a geographic area based on the selected data sample. The computer readable storage medium also includes computer executable instructions to adjust an operational characteristic of a drone while the drone is in the geographic area, where the operational characteristic is adjusted based on a configuration of the drone and the geo-fence.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Described herein are technical solutions for configuring a geo-fence to limit actions and impacts of a drone. In an example, an entity, such as a government agency, a property owner, a drone manufacturer, or any other entity limits an action or capability of a drone based on one or more geo-fences. Each geo-fence may limit a specific action or actions by the drone. The geo-fence may be static, such as based on regulations of a community, a county, a city, a state, or any other regulations. Alternatively or in addition, the geo-fence may be configured dynamically based on attributes and capabilities of the drone. A user may enable or change the geo-fence dynamically in real-time.

Figure 1:
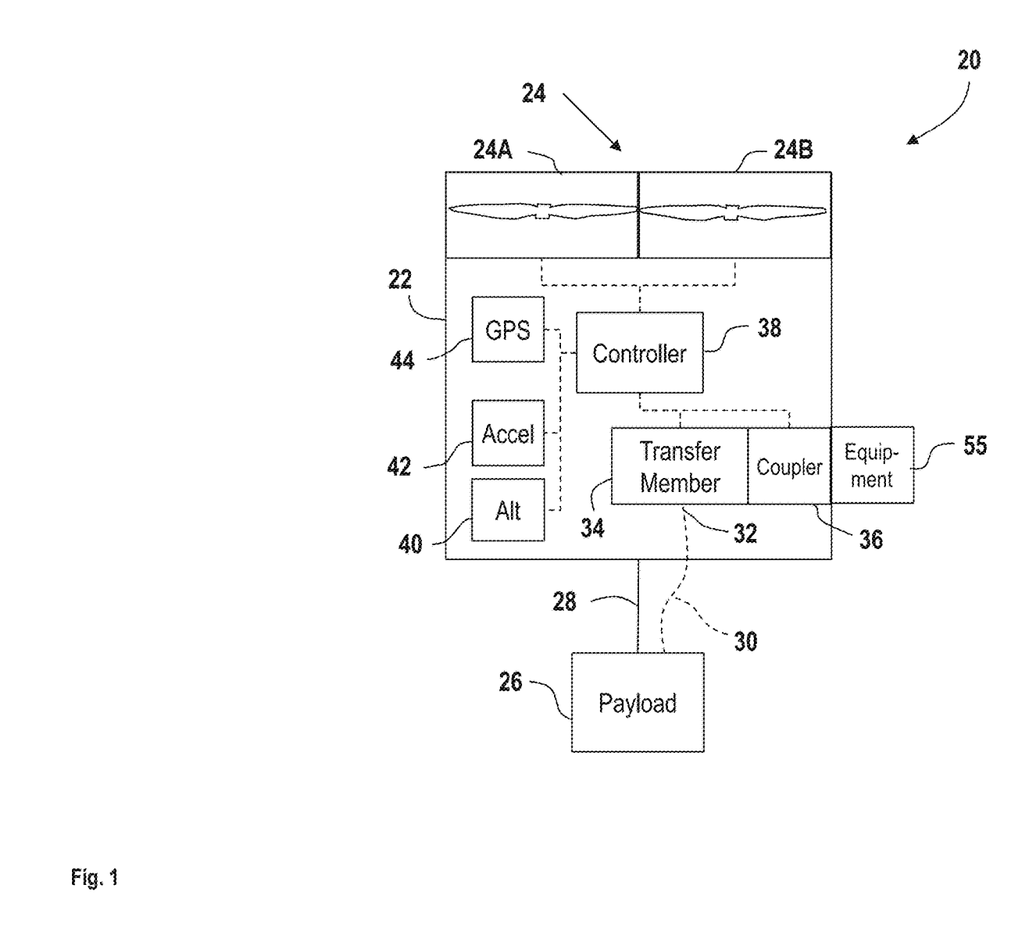
FIG. 1 illustrates an example drone in accordance with an embodiment.

Referring now to FIG. 1, an embodiment is shown of an autonomous drone 20 or unmanned aerial vehicle. As used herein, the term "drone" refers to an aerial vehicle capable to operating autonomously from a human operator to perform a predetermined function, such as deliver a payload or package for example. The drone 20 includes a fuselage 22 that supports at least one thrust device 24. In an embodiment, the drone 20 includes a plurality of thrust devices 24A, 24B, such as four thrust devices arranged about the periphery of the fuselage 22. In an embodiment, the thrust devices 24 include a propeller member that rotates to produce thrust. The thrust devices 24 may be configurable to provide both lift (vertical thrust) and lateral thrust (horizontal thrust). The vertical and horizontal components of the thrust allow the changing of the altitude, lateral movement and orientation (attitude) of the drone 20.

In the exemplary embodiment, the fuselage 22 and thrust devices 24 are sized and configured to carry a payload 26 or package, the payload 26 being releasably coupled to the fuselage 22 by a first tether 28. As will be discussed in more detail herein, the payload 26 may also be coupled to a second tether 30. The second tether 30 is coupled on one end to the payload 26 and on an opposite end 32 to a transfer member 34. In the exemplary embodiment, the transfer member 34 is a transfer arm that extends from a side of the fuselage 22. In an embodiment, the transfer arm may be an expandable or extendable member that may be extended or retracted for the payload transfer process. The expandable transfer arm may be actuated by hydraulic, pneumatic, electromechanical (motor with a power screw) or with magnetic (solenoid or linear actuator) assemblies.

In an embodiment, the end 32 is movably or slidably coupled to the transfer member 34 to allow the end 32 to move from the transfer member 34 to another transfer member on another drone or a stationary docking station. In an embodiment, the movement of the end 32 is under the influence of gravity. In an embodiment, the transfer member 34 includes a coupling device 36. The coupling device 36 may couple data capture equipment 55, such as an image capture equipment, a video capture equipment, an audio capture equipment, a depth capture equipment, or any other type of data capture equipment.

The drone 20 includes a controller 38 having a processing circuit. The controller 38 may include processors that are responsive to operation control methods embodied in application code such as those shown in FIGS. 14-15. These methods are embodied in computer instructions written to be executed by the processor, such as in the form of software. The controller 38 is coupled to transmit and receive signals from the thrust devices 24, the transfer member 34 and the coupling device 36 to determine and change their operational states (for example, extend transfer member 34, change polarity of coupling device 36, adjust lift from thrust devices 24). The controller 38 may further be coupled to one or more sensor devices that enable to the controller to determine the position, orientation and altitude of the drone 20. In an embodiment, these sensors may include an altimeter 40, a gyroscope or accelerometers 42 or a Global Positioning System (GPS) receiver 44.

Figure 2:
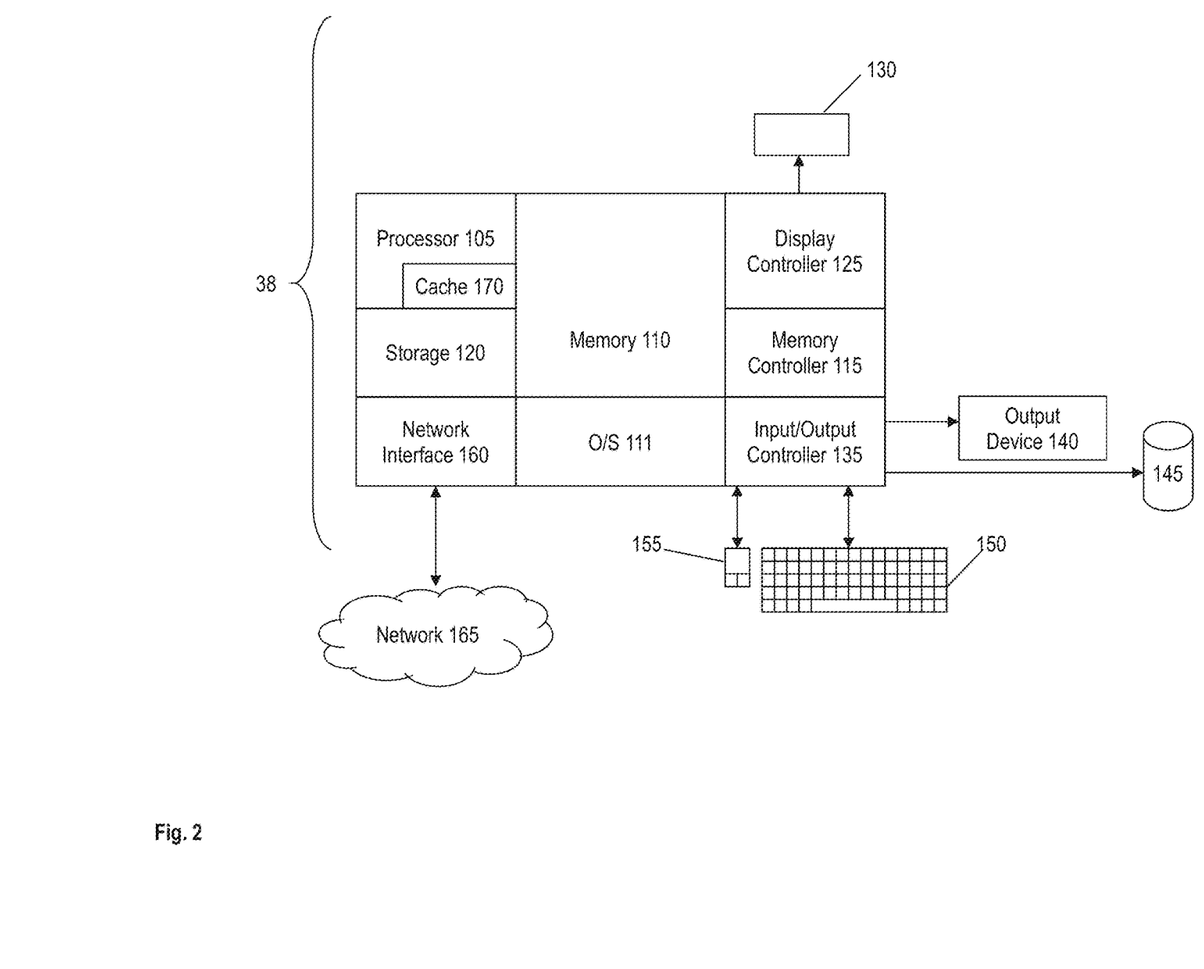
FIG. 2 illustrates an example controller in accordance with an embodiment.

FIG. 2 illustrates a block diagram of a controller 38 for use in implementing a system or method according to some embodiments. The systems and methods described herein may be implemented in hardware, software (for example, firmware), or a combination thereof. In some embodiments, the methods described may be implemented, at least in part, in hardware and may be part of the microprocessor of a special or general-purpose controller 38, such as a personal computer, workstation, minicomputer, or mainframe computer.

In some embodiments, as shown in FIG. 2, the controller 38 includes a processor 105, a memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135 when the drone is docked to allow personnel to service or input information. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the controller 38, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The controller 38 may further include a display controller 125 coupled to a user interface or display 130. In some embodiments, the display 130 may be an LCD screen. In other embodiments, the display 130 may include a plurality of LED status lights. In some embodiments, the controller 38 may further include a network interface 160 for coupling to a network 165. The network 165 may be an IP-based network for communication between the controller 38 and an external server, client and the like via a broadband connection. In an embodiment, the network 165 may be a satellite network. The network 165 transmits and receives data between the controller 38 and external systems. In an embodiment, the external system may be another aerial drone or a drone docking system, wherein the transmitting and receiving of data allows the controller 38 to identify the other drone or docking system and determine when the payload is to be transferred to the other drone. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in controller 38, such as that illustrated in FIG. 2.

Figure 3:
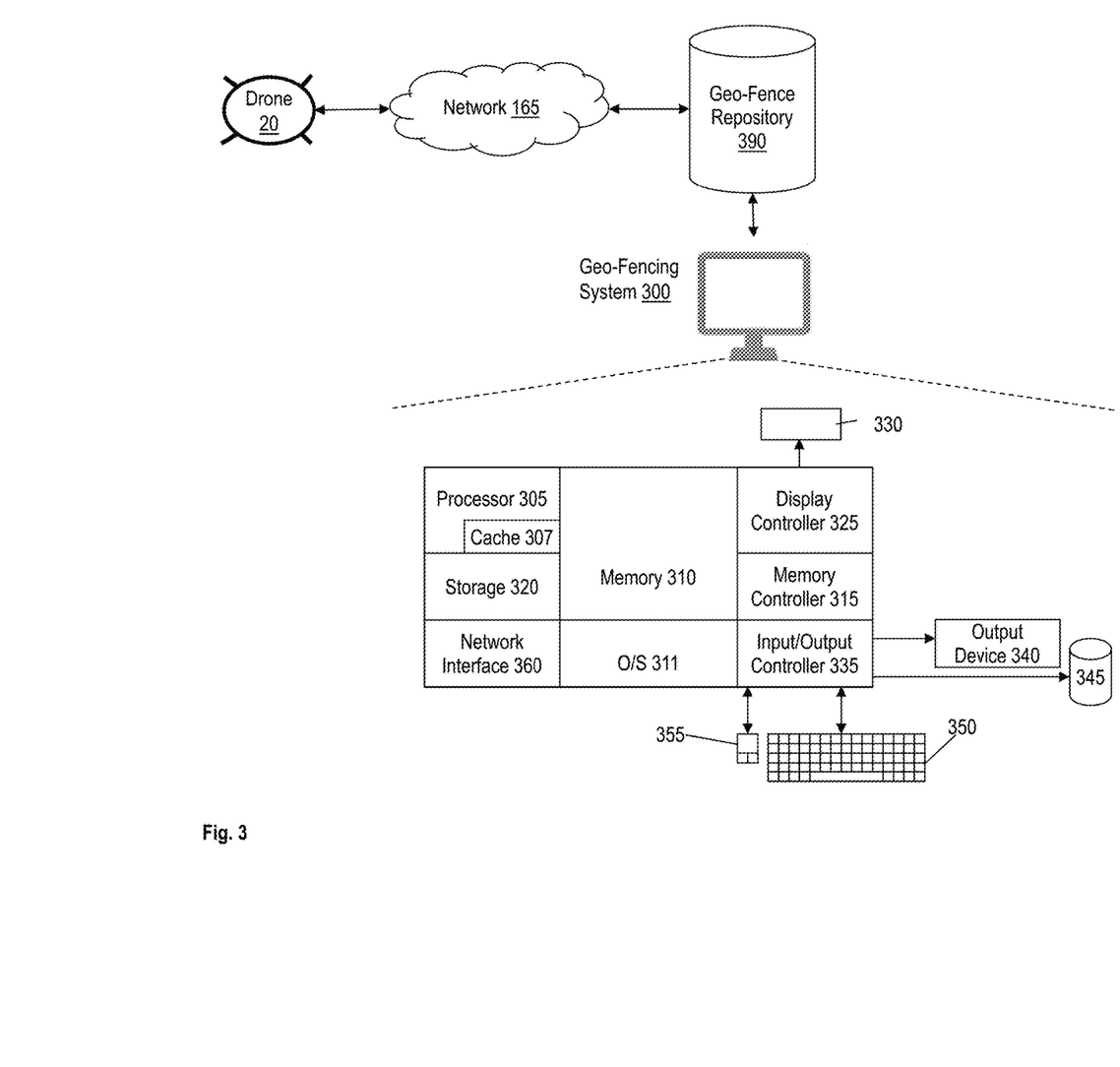
FIG. 3 illustrates an example geo-fencing system in accordance with an embodiment.
Figure 4:
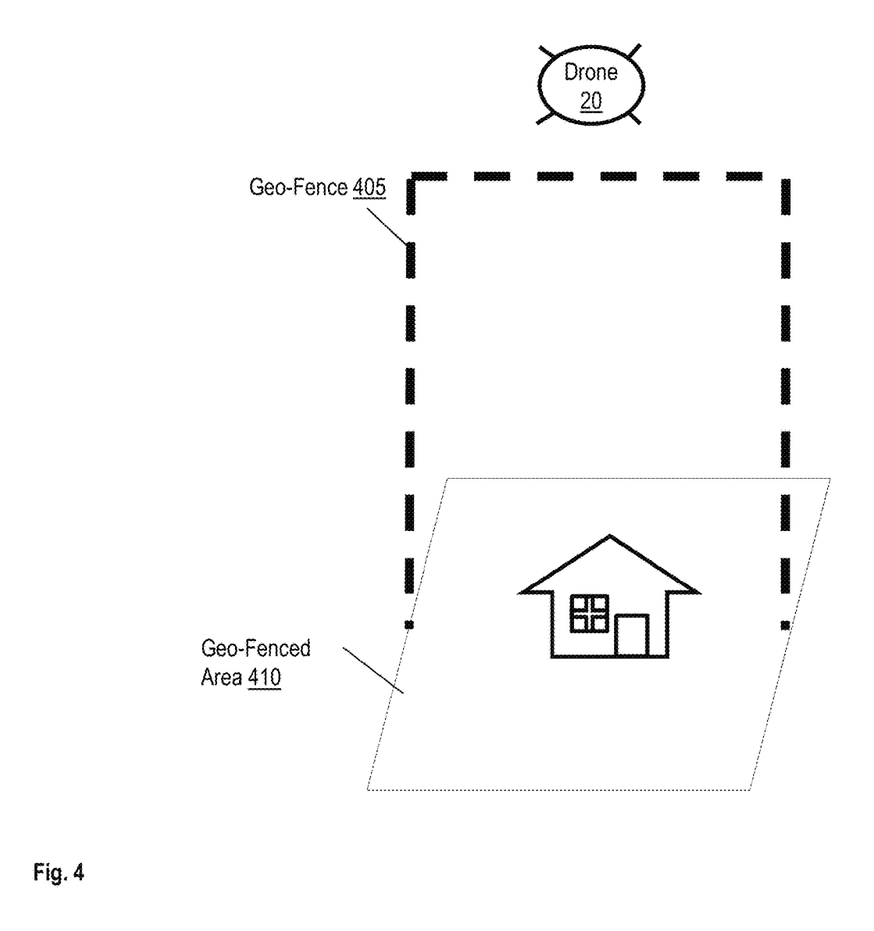
FIG. 4 illustrates an example geo-fence in accordance with an embodiment.

FIG. 3 illustrates an example geo-fencing system 300. FIG. 4 illustrates a geo-fence 405 associated with a geo-fenced area 410. The geo-fence 405 restricts the drone 20 within the geo-fenced area 410. Alternatively or in addition, the geo-fence 405 restricts the drone 20 to stay on one side of the geo-fence 405. The geo-fence 405 excludes an object from going "inside" or restricts the object to stay "inside." The geo-fencing system 300 may configure the geo-fence 405. In an example, the geo-fencing system 300 sends, for storage, the geo-fence 405 to a geo-fencing repository 390. The drone 20 accesses the geo-fencing repository 390 to identify the geo-fence 405 associated with the geo-fenced area 410. The geo-fenced area 410 may be a private property or a public property. For example, the geo-fenced area 410 may be identified by a postal address, a combination of latitude and longitude values, a global positioning satellite location identifier, or any other identifier. The geo-fenced area 410 may be a boundary of a house, a pool within the boundary of the house, a park, a museum, or any other geographic area.

The geo-fencing repository 390 may be a database accessible by the drone 20 via the network 165. For example, the drone 20 may download the geo-fence 405 stored in the geo-fencing repository 390 before taking flight. Alternatively or in addition, the drone 20 may access the geo-fence 405 from the geo-fencing repository 390 during flight. For example, as the drone 20 approaches the geographic area that is represented by the geo-fenced area 410, the drone 20 is notified of the corresponding geo-fence 405.

A user of the geo-fencing system 300 configures the geo-fence 405 to restrict the drone 20 within the geo-fenced area 410. For example, the user may be owner of the geo-fenced area 410, a resident of the geo-fenced area, a government agency, a drone manufacturer, a drone owner, or any other user. The government agency may be a flight administrative agency, a city council, a county council, or any other government agency. The user may configure the geo-fence 405 to impose restrictions that are compliant with regulations, such as those applicable in the geo-fenced area 410. In an example, the geo-fencing system 300 or the geo-fencing repository 390 may include limits imposed by local, state, and federal laws related to geo-fencing the drone 20. For example, if current regulations state that the drone 20 is restricted to fly between 200 and 400 feet, the geo-fencing system 300 prevents a user from configuring the geo-fence 405 to specify that the drone 20 is restricted from flying below 500 feet. Thus, the geo-fencing system 300 facilitates the user to configure the geo-fence 405 within the restrictions of the regulations.

Further, the geo-fencing system 300 facilitates the user to define the geo-fenced area 410 as a specific area within a property. Further, the geo-fence 405 may vary the restrictions/permissions depending on the time of day or the specific location within the geo-fenced area 410. The geo-fencing system 300 saves the geo-fence thus configured into the geo-fencing repository 390 for access by the drone 20.

Figure 5:
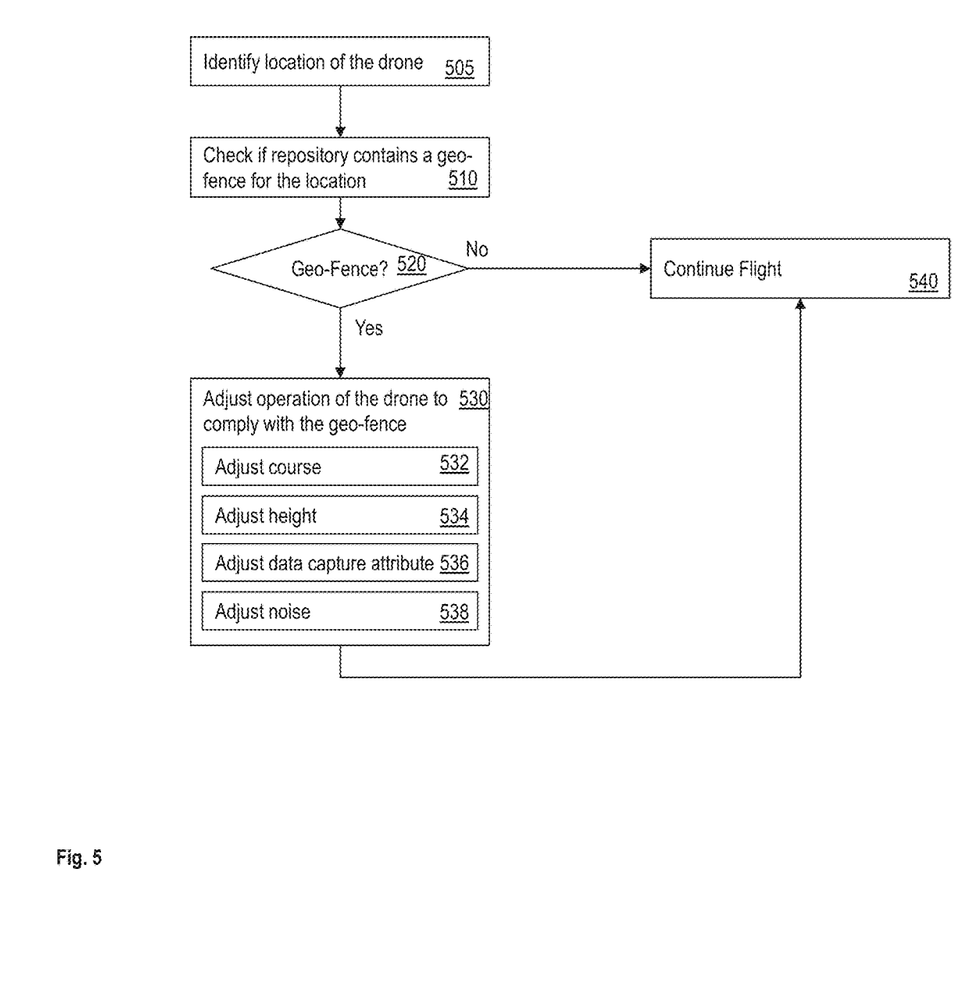
FIG. 5 illustrates an example flowchart of using a geo-fence in accordance with an embodiment.

FIG. 5 illustrates a flowchart of an example operation of the drone 20. The controller 38 is continuously monitoring the geographical location of the drone 20, as shown at block 505. The controller 38 determines if the current location of the drone 20 is associated with a geo-fence, as shown at block 510. The controller 38 may access the geo-fencing repository 390 during the flight or alternatively, may have downloaded the contents of the geo-fencing repository 390 prior to taking flight. If the current location is not associated with a geo-fence, the drone continues the flight without any changes, and as previously planned, as shown at blocks 520 and 540. Else, if the controller 38 identifies the geo-fence 405 corresponding to the geo-fenced area 410, based on the geo-fencing repository 390, the controller 38 adjusts the operation of the drone 20, as shown at block 530. The adjustment includes adjusting an operational characteristic of the drone 20, such as a setting of the image capture equipment, a setting of the audio capture equipment, a setting associated with a noise level, or a setting associated with a flight course and/or height of the drone 20. The adjustment may include adjusting one or more of a course of the drone, a height of the drone, a data capture attribute of the drone, or a noise level of the drone, among other things, as shown at blocks 532, 534, 536, and 538 respectively. The drone continues the flight after the adjustment(s), as shown at block 540.

Adjusting the course of the drone 20 may include not entering and circumventing the geo-fenced area 410. In another example, adjusting the course may also include returning to the geo-fenced area 410 at a later time according to the scheduled times associated with the geo-fence 405. Adjusting the height of the drone 20 includes flying the drone 20 within a range prescribed by the geo-fence 405.

Adjusting the data capture attribute of the drone 20 includes changing quality-setting attributes of data capture equipment on the drone 20 The controller 38 may adjust settings of one or more of the image capture and the audio capture equipment of the drone 20. For example, the geo-fence 405 restricts drones based on their respective image capture ranges or audio capture ranges. For example, the geo-fence 405 specifies a predetermined data capture quality level. For example, a predetermined image quality level may identify a predetermined contrast level, a predetermined sharpness level, or any other image attribute or a combination thereof to determine a quality level of an image captured by the drones. In an example, the predetermined image quality level specified by the geo-fence 405 may prescribe a number of mega-pixels, a maximum zoom-level, and other such attributes of the image capture equipment of the drone 20. If the drone 20 is equipped with an image capture device capable of an image quality level above the predetermined level, the controller 38 adjusts the operation of the drone to comply with the geo-fence 405. Thus, the geo-fence 405 is dynamic. The drone 20 adjusts the operation according to the capabilities of the drone 20 in response to determining the specifications of the geo-fence 405.

For example, consider that the drone 20 is equipped with a camera that is capable of capturing an image of 25 mega-pixels from up to 200 feet away, and if the geo-fence 405 specifies a maximum image quality of 2 mega-pixels from 200 feet away. The drone 20, upon reaching the geo-fenced area 410, adjusts operation to comply with the geo-fence 405 by either setting the image capture quality to two mega-pixels and flying at 200 feet, or by flying at a much higher distance, such as 2000 feet and capturing thirteen mega-pixel images, or by circumventing the geo-fenced area 410. Thus, the geo-fence 405 dynamically restricts the drone 20. Another drone, equipped with a camera that captures one mega-pixel pictures, upon reaching the geo-fenced area, does not adjust the operation, since the other drone's capabilities are within the limits prescribed by the geo-fence 405 in this example. Of course, other examples may have other values for prescribed limits and capabilities. Thus, the geo-fence 405 may cause an adjustment of the operational characteristic of the image capture equipment, such as a zoom-level, a mega-pixel level, a shutter speed, an aperture size, a sensitivity level (such as ISO), a white-balance, a contrast-level, or any other setting of the image capture equipment.

Figure 7:
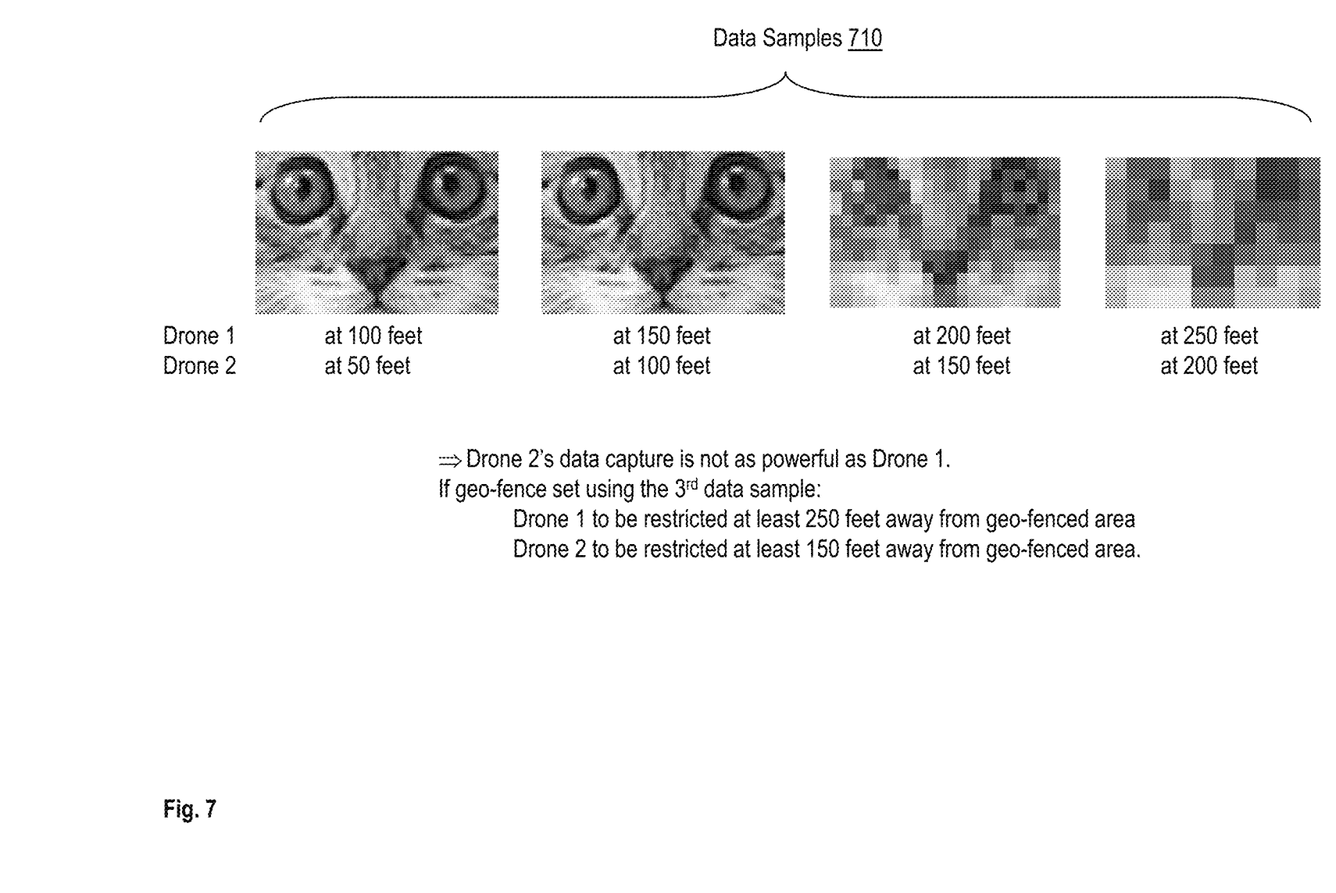
FIG. 7 illustrates an example scenario of accessing multiple data samples to configure a geo-fence in accordance with an embodiment.

FIG. 7 illustrates an example scenario in which drones with different capabilities capture a plurality of data samples 710. For example, consider that a first drone is equipped with data capture equipment, such as a camera that is of a higher quality than a camera of a second drone. As illustrated, the first drone is capable of capturing an image of a predetermined quality level from 200 feet away, and the second drone is capable of capturing an image of the same predetermined quality level from 150 feet away (that is closer than the first drone). In this scenario, if the image quality level of the third image is used as the predetermined quality level, the geo-fence 405 restricts the first drone to fly at least 200 feet high (away) from the geo-fenced area 410, and the geo-fence 405 restricts the second drone to fly at least 150 feet high (away) from the geo-fenced area 410. Thus, the geo-fence 405 dynamically restricts different drones.

In another example, the geo-fence 405 may specify a predetermined audio quality level that affects the operation of the drone 20 dynamically. For example, the geo-fence 405 may specify audio quality parameters such as decibel level, clarity level, bass, treble, signal-to-noise-ratio, or any other parameter or a combination thereof to identify the predetermined audio quality level. For example, if the drone 20 is equipped with the audio capture equipment that is capable of capturing audio data of the predetermined quality level from up to 200 feet away, then the geo-fence 405 restricts the drone 20 to fly at least 200 feet high (away) from the geo-fenced area 410. The drone 20, upon reaching the geo-fenced area 410, adjusts the operation according to the predetermined audio quality level specified by the geo-fence 405. For example, the drone may adjust the audio capture settings, fly at a different height, or circumvent the geo-fenced area 410 altogether. Thus, the geo-fence 405 may cause an adjustment of the operational characteristic of the audio capture equipment, such as a bit-rate, a frequency, a mode (mono/stereo), format, or any other setting of the audio capture equipment.

In yet another example, the geo-fence 405 may specify a predetermined limit on a noise level emitted by the drone. The drone 20, in response may adjust the height of flight, course of flight, and/or noise level of the drone 20. Adjusting the noise level of the drone 20 may include reducing (or increasing) noise emission level of the drone 20 according to a limit prescribed by the geo-fence 405. For example, the controller 38 may cause the drone to move slower (or faster) to reduce the noise level. Alternatively or in addition, the controller 38 may change a speed of rotors of the drone 20 to adjust the noise level. For example, if the drone 20 emits a noise that is above the predetermined threshold, such as during flight, the geo-fence 405 restricts the drone 20 from being within a predetermined distance of the geo-fenced area 410. For example, if the drone 20 emits fifty decibels of noise above the limit prescribed by the geo-fence 405, the drone 20 is restricted to fly at least two-hundred feet above the geo-fenced area 410. If another drone emits noise above the limit, the other drone may be restricted to fly, say, at least five hundred feet above the geo-fenced area 410. Other predetermined noise levels and predetermined distances may be used in other examples. Thus, the geo-fence 405 may cause an adjustment of the operational characteristic of the drone 20 such as rotor speed, motor speed, or any other settings that change the noise level of the drone 20. Further, the geo-fence 405 may cause an adjustment of the operational characteristic of the drone 20 such as flying height or any other setting of that affects a flight-course of the drone 20.

In yet another example, the geo-fence 405 may specify a combination of the image capture quality, audio capture quality, and noise emission level of the drone 20. Different drones may adjust their respective operation differently upon reaching the geo-fenced area 410, as described herein. Thus, the geo-fence 405 provides a dynamic geo-fence for the drone 20.

The geo-fencing system 300 facilitates a user to update the geo-fencing repository 390 by configuring the geo-fence 405 in the geo-fencing repository 390. By configuring, the geo-fencing system 300 may either create the geo-fence 405 in the geo-fencing repository 390, or change settings of the geo-fence 405 that already exists in the geo-fencing repository 390.

The geo-fencing system 300 may be a communication apparatus, such as a computer. For example, the geo-fencing system 300 may be a desktop computer, a tablet computer, a laptop computer, a phone, such as a smartphone, a server computer, or any other device that communicates via the network 165. The geo-fencing system 300 includes hardware, such as electronic circuitry. The geo-fencing system 300, as illustrated in FIG. 3, may include a processor 305, memory 310 coupled to a memory controller 315, and one or more input devices 345 and/or output devices 340, such as peripheral or control devices, that are communicatively coupled via a local I/O controller 335.

Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the system 300, a semiconductor based microprocessor (in the form of a microchip or chip set), a macroprocessor, or other device for executing instructions. The processor 305 includes a cache 307, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 307 may be organized as a hierarchy of more cache levels (L1, L2, and so on.).

The memory 310 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the systems and methods of this disclosure.

The system 300 may further include a display controller 325 coupled to a user interface or display 330. In some embodiments, the display 330 may be an LCD screen. In other embodiments, the display 130 may include a plurality of LED status lights. In some embodiments, the system 300 may further include a network interface 360 for coupling to a network 165. The network 165 transmits and receives data between the system 300 and external systems, such as the geo-fencing repository 390. Alternatively or in addition, the network 165 transmits and receives data between the system 300 and the drone 20.

In an example, the geo-fencing system 300 facilitates configuring the geo-fence 405 to restrict air space access. For example, the geo-fence 405 may restrict the ability of the drone 20 to fly within an area of the geo-fenced area 410. For example, the geo-fence 405 may specify that the drone 20 cannot fly above a house, but can fly over a barn in the geo-fenced area 410. Alternatively or in addition, the geo-fence 405 may specify that the drone 20 cannot fly below a specific height within the geo-fenced area 410. Alternatively or in addition, the geo-fence 405 may specify that the drone 20 cannot fly in the geo-fenced area 410 during specific times/days or fly below a certain height during specific times/days. Further, the geo-fence 405 may specify services available to the drone 20 at the geo-fenced area 410, such as a charging station, a solar charging station, a landing area, and the times/days these services are available. The geo-fence 405 may further identify contact information for scheduling access to the services. In an example, the geo-fence 405 may be configured to specify whether the drone 20 can land within the geo-fenced area 410 to make deliveries, and times/days when deliveries are allowed. In another example, the geo-fence 405 limits landing access to specific drones or allows access to all drones except for those explicitly disallowed. Access may be further limited to times/days by user. Alternatively or in addition, the geo-fence identifies an authorization for a different group that the drone 20 belongs to. For example, the geo-fence authorizes a drone from a package delivery service such as, UNITED STATES POSTAL SERVICES™, or FEDEX™ to land and deliver a package, and does not allow other drones, such as a personal drone, to land. In yet another example, the geo-fence 405 may specify that the drone 20 request permission to land/deliver/fly-over the geo-fenced area 410 such as via a phone message/text, an online instant message, or any other communication system. In another example, the geo-fence indicates to the drone 20 an area where the drone 20 cannot take video/photo. Alternatively or in addition, the geo-fence identifies an area where the drone 20 cannot capture audio. Thus, the geo-fence 405 causes adjustment to an operation the drone 20.

Figure 6:
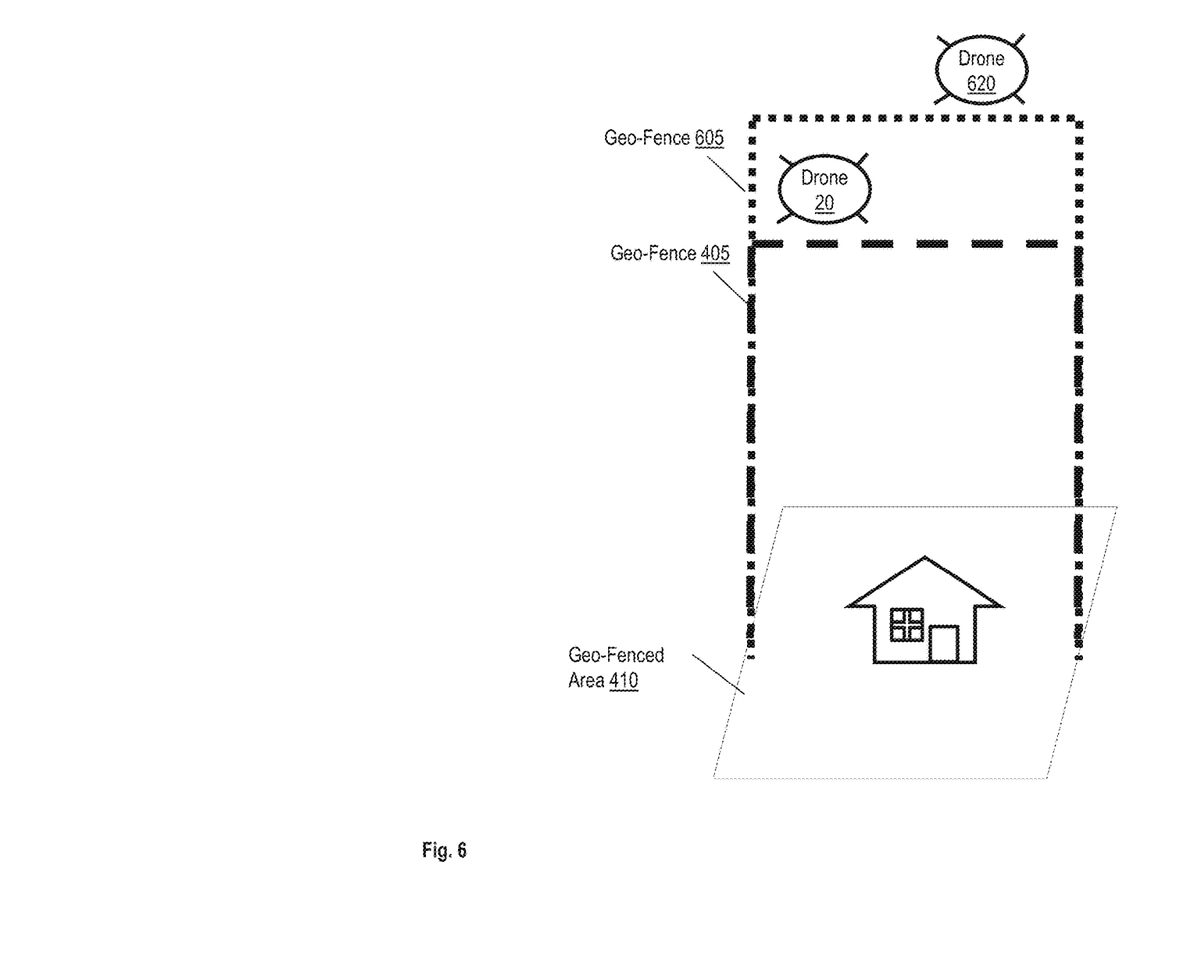
FIG. 6 illustrates an example geo-fenced area using multiple geo-fences in accordance with an embodiment.

In addition to the dynamic geo-fence 405, as described herein, in another example, the geo-fencing system 300 facilitates configuring static geo-fences to restrict the drone 20 and further adjust the operation of the drone 20. In an example, the geo-fencing system 300 facilitates configuring the geo-fence 405 for the drone 20 with specific capabilities. Accordingly, as illustrated in FIG. 6, the geo-fencing system 300 facilitates a user to configure separate geo-fences 405 and 605 for the same geo-fenced area 410. The different geo-fences 405 and 605 restrict drones with varied capabilities, such as the drones 20 and 620, based on their respective capabilities. For example, the drone 620 may be equipped with data capture equipment that captures data, such as images or audio, of higher quality than the data capture equipment of the drone 20. Therefore, the geo-fence 605 may restrict the drone 620, with higher quality data capture capabilities from flying as low as the drone 20 that has comparatively lower quality data capture capabilities.

For example, the geo-fences 405 and 605 restrict the drones 20 and 620 respectively based on their respective image capture ranges. For example, consider the scenario of FIG. 7. As illustrated, the first drone is capable of capturing an image of a predetermined quality level from 200 feet away, and the second drone is capable of capturing an image of the same predetermined quality level from 150 feet away (that is, closer than the first drone). In this scenario, if the image quality level of the third image is used as the predetermined quality level, the geo-fence 405 restricts the first drone to fly at least 200 feet high (away) from the geo-fenced area 410, and the geo-fence 605 (a second geo-fence) restricts the second drone to fly at least 150 feet high (away) from the geo-fenced area 410. Thus, the geo-fences 405 and 605 statically restrict different drones.

In another example, the geo-fencing system 300 configures the geo-fences to restrict the drones 20 and 620 based on respective audio quality levels. In another example, the geo-fencing system 300 configures the geo-fences 405 and 605 to restrict the drones 20 and 620 based on respective noise-levels. Thus, the geo-fencing system 300 facilitates configuring multiple geo-fences for the geo-fenced area 410 such that different drones with different capabilities are restricted according to a respective geo-fence.

Figure 8:
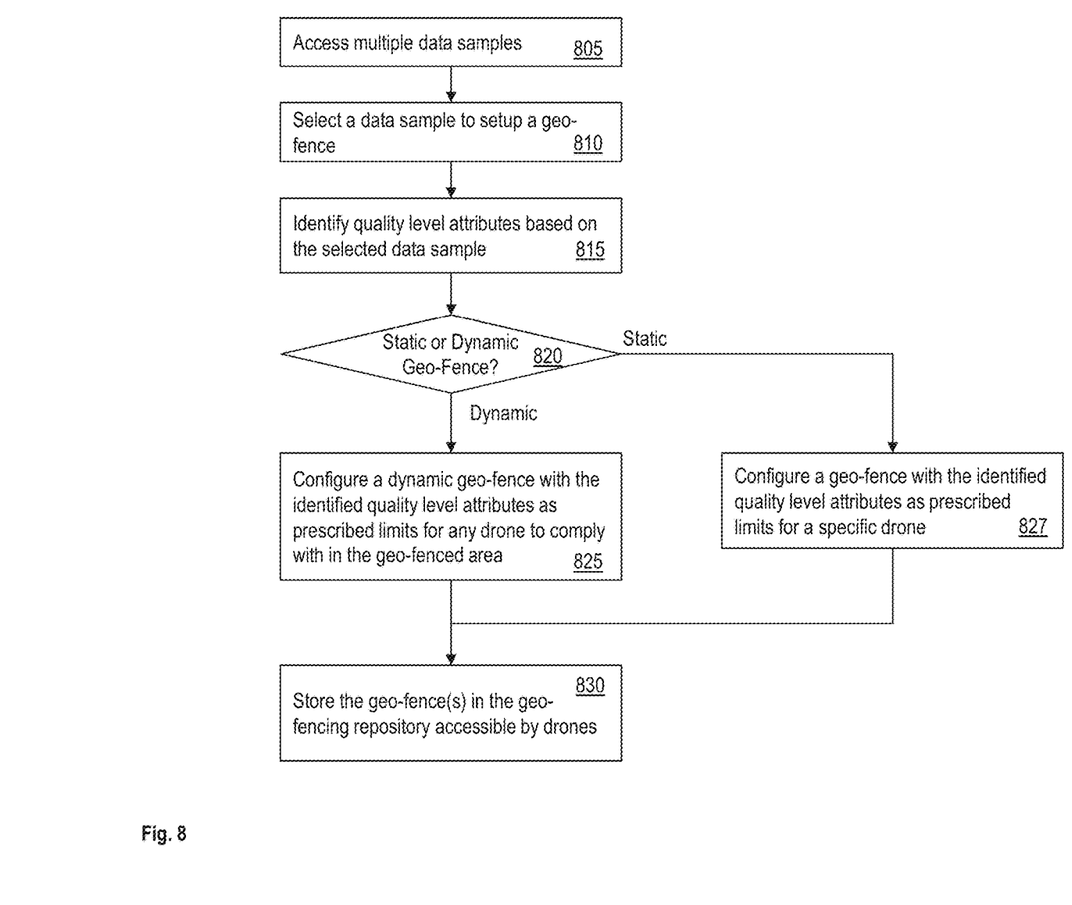
FIG. 8 illustrates an example flowchart for configuring a geo-fence in accordance with an embodiment.

FIG. 8 illustrates a flowchart of example logic to configure a geo-fence using the geo-fencing system 300. The geo-fencing system 300 facilitates accessing multiple data samples, such as multiple images or audio samples, or any other captured data, as shown at block 805. In an example, the data samples are received by the geo-fencing system 300. The data samples are all of different quality levels, such as those illustrated in FIG. 7. The user of the geo-fencing system selects one of the data samples as a threshold quality level associated with the geo-fence, as shown at block 810. For example, consider that from the set of data samples illustrated in FIG. 7, the third data sample from the left is selected. Based on the selection, the geo-fencing system 300 identifies the quality levels to be associated with the geo-fence, as shown at block 815. For example, the geo-fencing system 300 identifies that the selected data sample is an image captured at 3 mega-pixels with a 2× zoom-factor from 150 feet. The geo-fencing system 300 identifies different attributes in other examples.

The geo-fencing system 300 determines if a static or a dynamic geo-fence is to be configured, as shown at block 820. In an example, the geo-fencing system 300 may configure both, static and dynamic geo-fences. In case a dynamic geo-fence is to be configured, the geo-fencing system 300 creates or updates a geo-fence that prescribes the identified quality level attributes as limits for any drone to comply with in the geo-fenced area 410, as shown at block 825. Accordingly, any drone entering the geo-fenced area adjusts operation to comply with the prescribed limits. Alternatively or in addition, if the geo-fencing system 300 is configuring a static geo-fence, the geo-fencing system 300 creates or updates one or more geo-fences respectively for drones with different capabilities, as shown at block 827. For example, the geo-fencing system 300 configures a geo-fence with the identified quality level attributes as prescribed limits for a specific drone. For example, based on the selection of the data sample in the scenario illustrated in FIG. 7, the geo-fence for a drone with capabilities identical to drone-1 prescribes being at least 250 feet away from the geo-fenced area. The geo-fence for a drone with capabilities of drone-2 prescribes limits of at least 150 feet away from the geo-fenced area. The geo-fencing system 300 stores the configured geo-fence(s) into the geo-fencing repository for drones to access, as shown at block 830.

Figure 9:
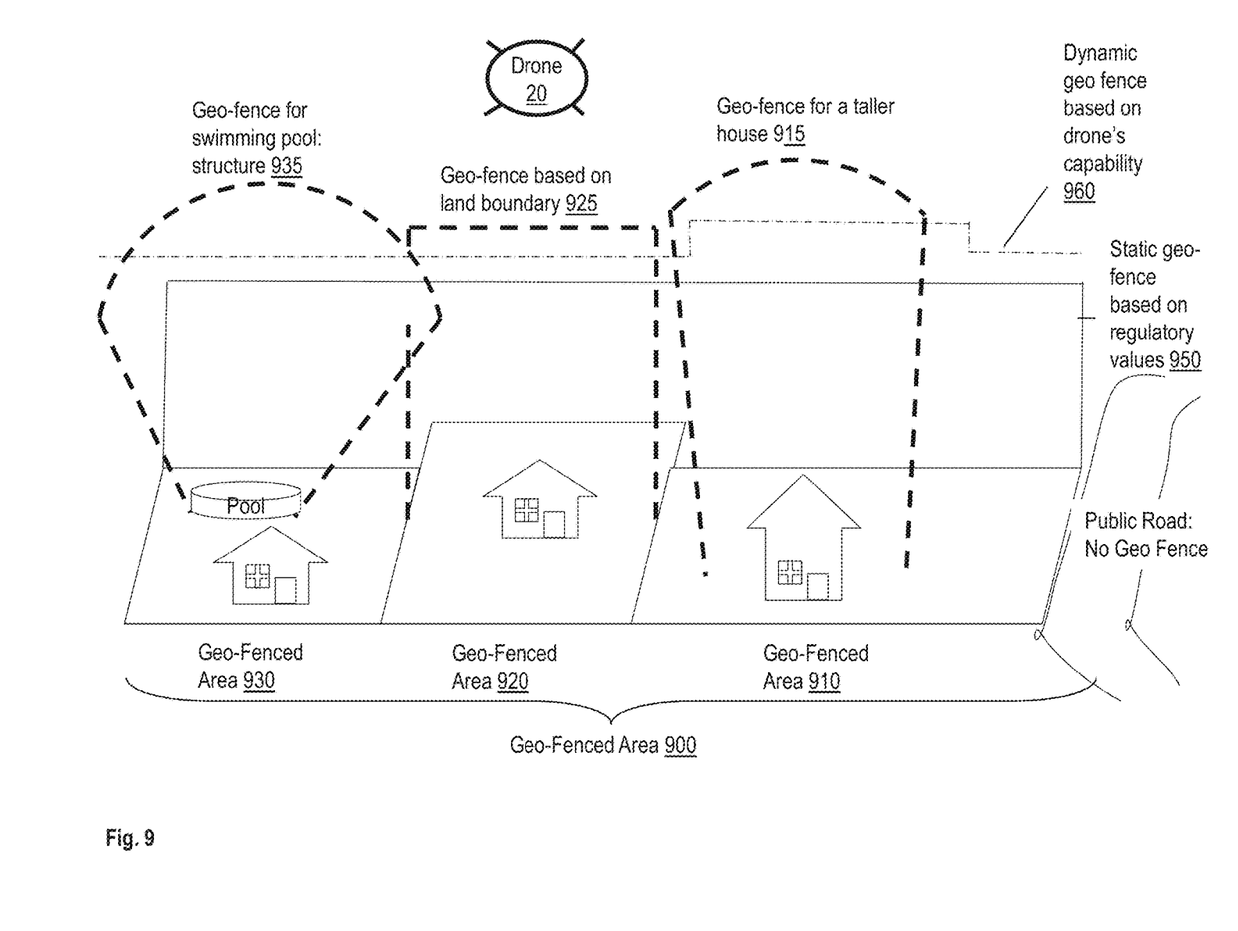
FIG. 9 illustrates an example scenario with multiple geo-fences in accordance with an embodiment.

FIG. 9 illustrates multiple geo-fences configured using the geo-fencing system 300. As illustrated, the drone 20 experiences a combination of static and dynamic geo-fences. For example, a geo-fenced area 900 may include multiple geo-fenced areas, a geo-fenced area 910, a geo-fenced area 920, and a geo-fenced area 930. The geo-fenced area 900 may be a community such as a city, a county, a sub-division, or any other collection of geo-fenced areas. Each of the geo-fenced areas within the geo-fenced area 900 may be a residence, a business, a factory, or any other type of property. The geo-fenced area 900 may also include public property, such as a public road. The geo-fenced area 900 may use a geo-fence 950. The geo-fence 950 may be a static geo-fence that encompasses the multiple properties within the geo-fenced area 900. In an example, a government agency, a property manager, or any other entity configures the static geo-fence 950 based on regulatory values applicable to the geo-fenced area 900. The geo-fence 950 may prescribe threshold limits based on the regulatory values. In addition, the government agency or any other entity may configure a dynamic geo-fence 960 for the geo-fenced area 900. The dynamic geo-fence 960 may be based on capabilities of the drone as described herein. As illustrated, the dynamic geo-fence 960 prescribes a different height for the drone to fly over the geo-fenced area 930 than the geo-fenced areas 910 and 920, whereas the static geo-fence 950 has the same prescribed height across all the geo-fenced areas 910, 920, and 930.

In addition or alternative to the geo-fences 950 and 960, each geo-fenced area 910, 920, and 930 within the geo-fence 950 may be separately geo-fenced using static and/or dynamic geo-fences that owners, residents, or other entities configure. For example, the geo-fenced areas 910, 920, and 930 are associated with respective geo-fences 915, 925, and 935, and accordingly may prescribe varying limits. The geo-fence 915 may prescribe a different height than that in the geo-fences 925 and 935. For example, the geo-fence 915 may prescribe a height more than that in the geo-fences 925 and 935 as a consequence of a taller building in the corresponding geo-fenced area 910. The geo-fence 925 may restrict the drone 20 from entering the geo-fenced area 920. The geo-fence 935 may restrict data capture different more than the data capture restrictions in the geo-fences 925 and 915 since the geo-fenced area 930 includes a swimming pool. Other variations in the prescribed limits are possible in other examples.

Thus, technical solutions described herein facilitate configuring one or more geo-fences for a geographical location. The geo-fences may be static or dynamic. A static geo-fence restricts a drone from entering a geo-fenced area in response to the drone not complying with a prescribed limit of the static geo-fence. A dynamic geo-fence restricts a drone by mitigating a capability of the drone according to the prescribed limit in the dynamic geo-fence. Accordingly, in case of a dynamic geo-fence, the drone may adjust its operation to overcome the prescribed limit. Alternatively, the technical solutions facilitate configuring more than one static geo-fence to accommodate drones of varying capabilities. The geo-fences are configured based on a representative data sample that is selected from multiple data samples by identifying the quality level attributes of the representative data sample and using the identified attributes to configure the geo-fences.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for configuring a dynamic geo-fence for a drone, the method comprising:
   receiving a plurality of data samples comprising a plurality of audio samples captured by an audio capture equipment of the drone from respective distances;
   selecting, from the plurality of data samples, a selected data sample as a threshold;
   configuring a geo-fence for a geographic area based on the selected data sample;
   determining audio attributes of the selected data sample from the plurality of audio samples;
   identifying a current value of an operational characteristic of the drone;
   identifying a second value of the operational characteristic, wherein audio attributes of an audio captured by the audio capture equipment using the second value are within a predetermined threshold of the audio attributes of the selected data sample; and
   adjusting the operational characteristic of the drone to the second value while the drone is in the geographic area, wherein the operational characteristic is adjusted based on a configuration of the drone and the geo-fence.

2. The computer implemented method of claim 1, wherein the drone is a first drone, and wherein the geo-fence adjusts the operational characteristic of the first drone to a first value, and the operational characteristic of a second drone to a third value, the first value being distinct from the third value.

3. The computer implemented method of claim 1, wherein the operational characteristic is a setting of an image capture equipment of the drone.

4. The computer implemented method of claim 1, wherein the operational characteristic is a setting of the audio capture equipment of the drone.

5. The computer implemented method of claim 1, wherein the operational characteristic adjusts a noise level of the drone.

6. The computer implemented method of claim 1, wherein the operational characteristic adjusts a flying height of the drone.

7. The computer implemented method of claim 1, wherein the plurality of data samples further comprises a plurality of images captured by an image capture equipment of the drone from respective distances.

8. The computer implemented method of claim 1, wherein the geo-fence is a first geo-fence, the drone is a first drone, and wherein the method further comprises:
configuring the first geo-fence for the geographic area based on the selected data sample, the first geo-fence corresponding to the first drone; and
configuring a second geo-fence for the geographic area based on the selected data sample from the first drone, the second geo-fence corresponding to a second drone.

9. A system for configuring dynamic geo-fences, the system comprising:
a memory configured to store a plurality of data samples comprising a plurality of audio samples captured by an audio capture equipment of a drone from respective distances; and
a processor configured to:
select, from the plurality of data samples, a selected data sample as a threshold;
configure a geo-fence for a geographic area based on the selected data sample;
determine audio attributes of the selected data sample from the plurality of audio samples;
identify a current value of an operational characteristic of the drone;
identify a second value of the operational characteristic, wherein audio attributes of an audio captured by the audio capture equipment using the second value are within a predetermined threshold of the audio attributes of the selected data sample; and
adjust the operational characteristic of the drone to the second value while the drone is in the geographic area, wherein the operational characteristic is adjusted based on a configuration of the drone and the geo-fence.

10. The system of claim 9, wherein the drone is a first drone, and wherein the geo-fence adjusts the operational characteristic of the first drone to a first value, and the operational characteristic of a second drone to a third value, the first value being distinct from the third value.

11. The system of claim 9, wherein the operational characteristic is a setting of an image capture equipment of the drone.

12. The system of claim 9, wherein the operational characteristic is a setting of the audio capture equipment of the drone.

13. The system of claim 9, wherein the operational characteristic adjusts a noise level of the drone.

14. The system of claim 9, wherein the plurality of data samples further comprises a plurality of images captured by an image capture equipment from respective distances.

15. The system of claim 9, wherein the geo-fence is a first geo-fence, the drone is a first drone, and wherein the processor is further configured to:
setup the first geo-fence for the geographic area based on the selected data sample, the first geo-fence corresponding to the first drone; and
setup a second geo-fence for the geographic area based on the selected data sample from the first drone, the second geo-fence corresponding to a second drone.

16. A computer program product for configuring dynamic geo-fences, the computer product comprising a non-transitory computer readable storage medium, the computer readable storage medium comprising computer executable instructions, wherein the computer readable storage medium comprises instructions to:
access a plurality of data samples comprising a plurality of audio samples captured by an audio capture equipment of a drone from respective distances;
select, from the plurality of data samples, a selected data sample as a threshold;
configure a geo-fence for a geographic area based on the selected data sample;
determine audio attributes of the selected data sample from the plurality of audio samples;
identify a current value of an operational characteristic of the drone;
identify a second value of the operational characteristic, wherein audio attributes of an audio captured by the audio capture equipment using the second value are within a predetermined threshold of the audio attributes of the selected data sample; and
adjust the operational characteristic of the drone to the second value while the drone is in the geographic area, wherein the operational characteristic is adjusted based on a configuration of the drone and the geo-fence.

17. The computer program product of claim 16, wherein the drone is a first drone, and wherein the geo-fence adjusts the operational characteristic of the first drone to a first value, and the operational characteristic of a second drone to a second value, the first value being distinct from the second value.

18. The computer program product of claim 16, wherein the operational characteristic is one of a setting of an image capture equipment, a setting of the audio capture equipment, a setting associated with a noise level, and a setting associated with a flying height of the drone.

19. The computer program product of claim 16, wherein the plurality of data samples further comprises a plurality of images captured by an image capture equipment of the drone from respective distances.

20. The computer program product of claim 16, wherein the geo-fence is a first geo-fence, the drone is a first drone, and wherein the computer readable storage medium further comprises instructions to:
setup the first geo-fence for the geographic area based on the selected data sample, the first geo-fence corresponding to the first drone; and
setup a second geo-fence for the geographic area based on the selected data sample from the first drone, the second geo-fence corresponding to a second drone.

* * * * *